W. B. Potter,
Nursing Bottle,
Nº 22,579.    Patented Jan. 11, 1859.
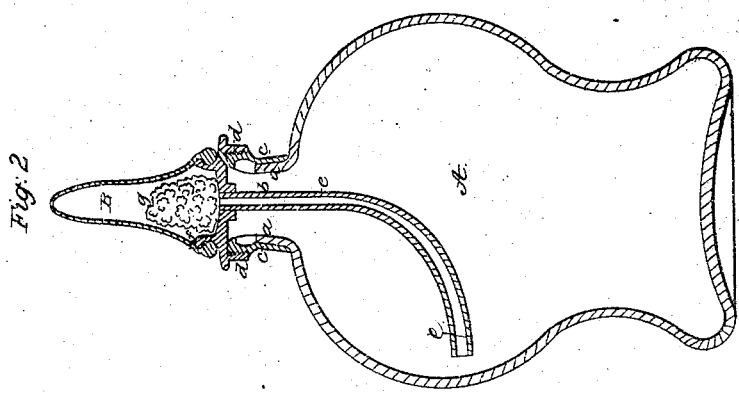
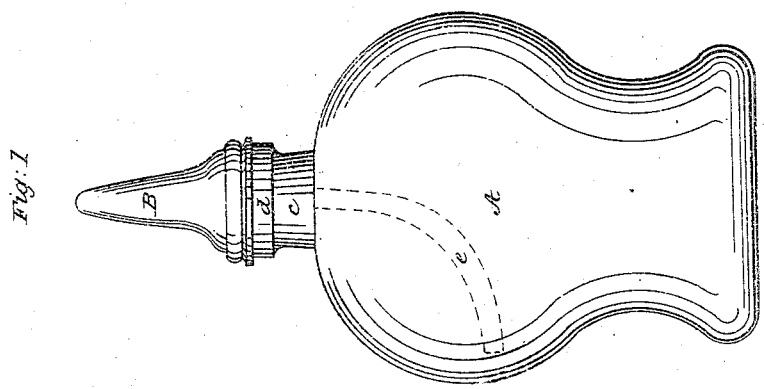

UNITED STATES PATENT OFFICE.

WARREN B. POTTER, OF BOSTON, MASSACHUSETTS.

NURSERY-BOTTLE.

Specification of Letters Patent No. 22,579, dated January 11, 1859.

*To all whom it may concern:*

Be it known that I, WARREN B. POTTER, of Boston, in the county of Suffolk and State of Massachusetts, have invented certain new and useful Improvements in Articles of Manufacture Known as "Nursery Bottles;" and I do hereby declare the following to be a full, clear, and exact description of the same, reference being had to the accompanying drawings, making a part thereof, in which—

Figure 1 represents a side view of the article in question, and Fig. 2 represents a central vertical section through the same.

Similar letters of reference where they occur in the separate figures denote like parts in both.

The present construction, of nursery bottles, is exceptionable, and does not meet the wants of the community. If made of silver, they are too expensive. If made of any of the inferior metals, they oxidize, and cannot be kept clean, and if made of glass, they are so fragile, as to readily break.

My object has been to so unite in one article the valuable properties of which such bottles, as have been heretofore constructed for this purpose, have been made, and leave out the objectionable parts or material, and by so doing have made an article cheap and durable and that meets the wants of commerce. This I have done, as follows: I make a glass bowl or bottle A, with a neck $a$ surrounding its opening $b$, and around this neck I secure a metallic boss $c$, by means of plaster or any other cement. A screw thread is cut on this boss $c$, into which a corresponding screw cut on or in the metallic cap $d$, fits. The cap $d$, has a metallic lacteal tube $e$, fastened to it, which tube extending downward into the bottle, curves around (as shown in the drawings) until its end nearly meets the swell of the bottle, the object of this being that when the bottle is held in a horizontal position, or as it is ordinarily held when in use, its entire contents may be drawn out through said tube $c$. A flange $f$, is raised on top of the cap $d$, which flange is slightly cut under, or rounded out, so as to securely hold the elastic nipple B, to it when placed thereon. This flange $f$, forms a cup on top of the cap $d$, and this cup serves to hold a piece of sponge $g$, or other filtering material, which overlies the end of the lacteal tube, and thus filters the milk or other material drawn through it.

When the nipple is made of prepared rubber, it can be extended so as to pass over the flange $f$, and then by releasing it, its own elasticity holds it there. When a natural udder is prepared and used for this purpose, as is sometimes done, it may have an elastic band or ring to hold it to the flange, in any way so that the interior may be readily arrived at for cleansing.

I am fully aware of the variety of these articles in the market, but there is no one of them so made as to possess the properties of my nursery bottle viz: cheapness, durability, perfect adaptability to its purpose, and so readily cleansed, and handled. And I make no claim to any such article, unless made of the material and form substantially as above described. And I claim the nursery bottle only as a new article of manufacture not hitherto known or introduced into the market.

Having thus fully described the nature of my invention, what I claim is—

A nursery bottle of glass, having a metallic cap screwed upon it, and a metallic lacteal tube, when said cap is provided with a flange for the reception of the elastic nipple, and the whole is made and put together substantially as herein set forth.

WARREN B. POTTER.

Witnesses:
   A. B. STOUGHTON,
   THOS. H. UEPPERMAN.